US008090656B2

(12) United States Patent
Solomon et al.

(10) Patent No.: US 8,090,656 B2
(45) Date of Patent: Jan. 3, 2012

(54) METHOD AND SYSTEM FOR SAVING MONEY WITH A GROUP OF MOBILE DEVICES

(76) Inventors: Leah Solomon, Brooklyn, NY (US); Jayson Halladay, Brooklyn, NY (US)

( * ) Notice: Subject to any disclaimer, the term of this patent is extended or adjusted under 35 U.S.C. 154(b) by 448 days.

(21) Appl. No.: 12/326,635

(22) Filed: Dec. 2, 2008

(65) Prior Publication Data

US 2010/0138341 A1  Jun. 3, 2010

(51) Int. Cl.
*G06Q 40/00* (2006.01)
(52) U.S. Cl. ............................................. 705/42; 705/35
(58) Field of Classification Search ............... 705/35–42
See application file for complete search history.

(56) References Cited

U.S. PATENT DOCUMENTS

| 7,685,034 | B1 * | 3/2010 | Mori et al. ....................... 705/31 |
| 2005/0137953 | A1 | 6/2005 | McDonough |
| 2007/0198382 | A1 | 8/2007 | Ferrari |
| 2008/0065561 | A1 | 3/2008 | Ethridge |

OTHER PUBLICATIONS

Goalmigo webpage print out, http://www.goalmigo.com/tour/1.*
http://www.goalmigo.com/ 3 pages printed Nov. 20, 2008.
http://www.mylifechanges.com/ 8 pages printed Nov. 20, 2008.
http://smartgoalsoftware.com/ 11 pages printed Nov. 20, 2008.
http://www.mygoals.com/tour_01.html 1 page printed Nov. 20, 2008.
http://mygoalmanager.com/ 2 pages printed Nov. 20, 2008.
http://www.joesgoals.com/ 2 pages printed Nov. 20, 2008.
http://www.goalstogether.com/ 1 page printed Nov. 20, 2008.
http://superviva.com/ 3 pages printed Nov. 20, 2008.
http://smartypig.com/ 2 pages printed Nov. 20, 2008.

* cited by examiner

*Primary Examiner* — Lindsay M Maguire
*Assistant Examiner* — Hao Fu
(74) *Attorney, Agent, or Firm* — Patent Authority LLC; Elliot Furman

(57) ABSTRACT

A plurality of users have a savings goal, and a plurality of mobile devices each belong to a user. An electronic message from a user's mobile device is received. The electronic message comprises a description of a service or product not purchased and the amount of money not spent because it was not purchased. The description and amount are stored and a running total of the amount of money not spent is computed. A second electronic message is transmitted to all of the plurality of mobile devices except the first mobile device. The second electronic message comprises the description, amount, and an identifier of the user of the first mobile. Receiving, storing, computing, and transmitting are repeated until the savings goal is reached. A system includes the plurality of mobile devices, at least one communication network, and a computer in communication with the communication network. The system may also include a bank.

22 Claims, 5 Drawing Sheets

METHOD AND SYSTEM FOR SAVING MONEY WITH A GROUP OF MOBILE DEVICES

BACKGROUND

While most people recognize the importance of saving money, many people find it very difficult to do so. According to recent findings by the Pew Research Center on the savings habits of Americans, 73% of people aged 24 to 49 say they should be saving more money. When asked what they would cut back on, responses fell largely into three categories: entertainment and recreation, food and dining out, and shopping and personal items.

In large part, these and other similar categories represent day-to-day expenditures consisting of small amounts spent here and there on things that are not necessarily needed but are desired at the time such as desserts, snacks, movies, clothing, meals out, and the like. These things are often extremely difficult to say no to because they are generally low-cost items and provide immediate gratification. If people were able to cut back on these types of small expenditures which occur regularly, if not daily, they could save a considerable amount of money over the course of a week, a month, or longer.

There are several commonly known techniques to save money. One technique is budgeting. Budgeting involves tracking expenses over time, identifying unnecessary expenditures, and then setting a weekly or monthly spending limit that eliminates the unnecessary expenditures. Unfortunately, adhering to a budget takes extreme discipline, especially when presented with an unnecessary but low-cost purchase that offers immediate gratification. In fact, studies have shown that people who keep budgets are as likely to overspend as those who do not budget.

Another technique to save is by setting up recurring, automatic drafts of money from one's checking account to one's savings account. Though this may work for some, it often creates a larger problem, because the technique does nothing to address spending habits. Success of this technique is premised on the idea that if the money is not available in one's checking account it simply cannot be spent. This would hold true if money were not available from some other source. However, the use of credit has become so common for even basic purchases that it takes great self-discipline not to use a credit card when the money in the checking account has run out. For example, a person might set up an automatic savings draft of $100 per month but then find themselves charging $110 on their credit card that month. If this money is not paid back immediately, there is not only no net savings for the month but, given the difference in interest charged on the borrowed money and paid on the "saved" money, the loss is compounded over time.

Yet another approach is to offer or share tips on saving money. Examples of tips include where and when sales and promotions are taking place, deals given by discount retailers, and which companies offer cheaper services. This may reduce one's costs, but if the product or service purchased was unnecessary, no "savings" can be claimed.

Given the shortcomings of the savings methods discussed above, a need presently exists for a savings method that will help people to alter their spending habits by providing them a reward for not spending. If the reward is great enough and can be delivered at the moment the decision to not spend is made, the immediate gratification promised by a product or service will not seem as compelling as otherwise, and the money will not be wasted but saved instead.

SUMMARY

A method for saving money with mobile devices comprises providing a plurality of mobile devices. Each of the plurality of mobile devices belongs to a user of a plurality of users. The plurality of users have a savings goal. An electronic account is created at a computer. A periodic sum of money to be saved by the plurality of users is computed. The periodic sum of money to be saved is computed according to the savings goal. A first electronic message is received. The first electronic message is received from a first mobile device of the plurality of mobile devices. The first electronic message comprises a description of a service or product not purchased by the user of the first mobile device and the amount of money not spent. The description and the amount is stored in the account, and a running total of the amount of money not spent is computed. A second electronic message is transmitted. The second electronic message is transmitted to all of the plurality of mobile devices except the first mobile device. The second electronic message comprises the description, amount, and an identifier identifying the user of the first mobile device belongs. The method repeats receiving, storing, computing the running total, and transmitting until the savings goal is reached. A system for saving money with mobile devices comprises at least one communication network, a plurality of mobile device operable to send and receive electronic messages and in communication with the at least one communication network, and a computer in communication with the at least one communication network. The system may also comprise a bank in communication with the communication network. The computer comprises a storage device and microprocessor, the storage device comprises computer executable code with when executed by the microprocessor causes the computer to carry out a method for saving money with mobile devices.

DETAILED DESCRIPTION

Briefly, the disclosed systems and methods give users the opportunity to commit money they are about to spend to a savings goal instead, and to do so using a mobile device. Giving the user the opportunity to take this action and then immediately sharing it with their savings partners can help to overwhelm the desire for immediate gratification with the rewards of having taken a step towards their goal, and being recognized by family and friends for having saved some money. Additionally, the user is encouraged by having their various commitments to save recorded and presented graphically on a website so they can further celebrate and share the process of accomplishing their goal.

Figure 1:
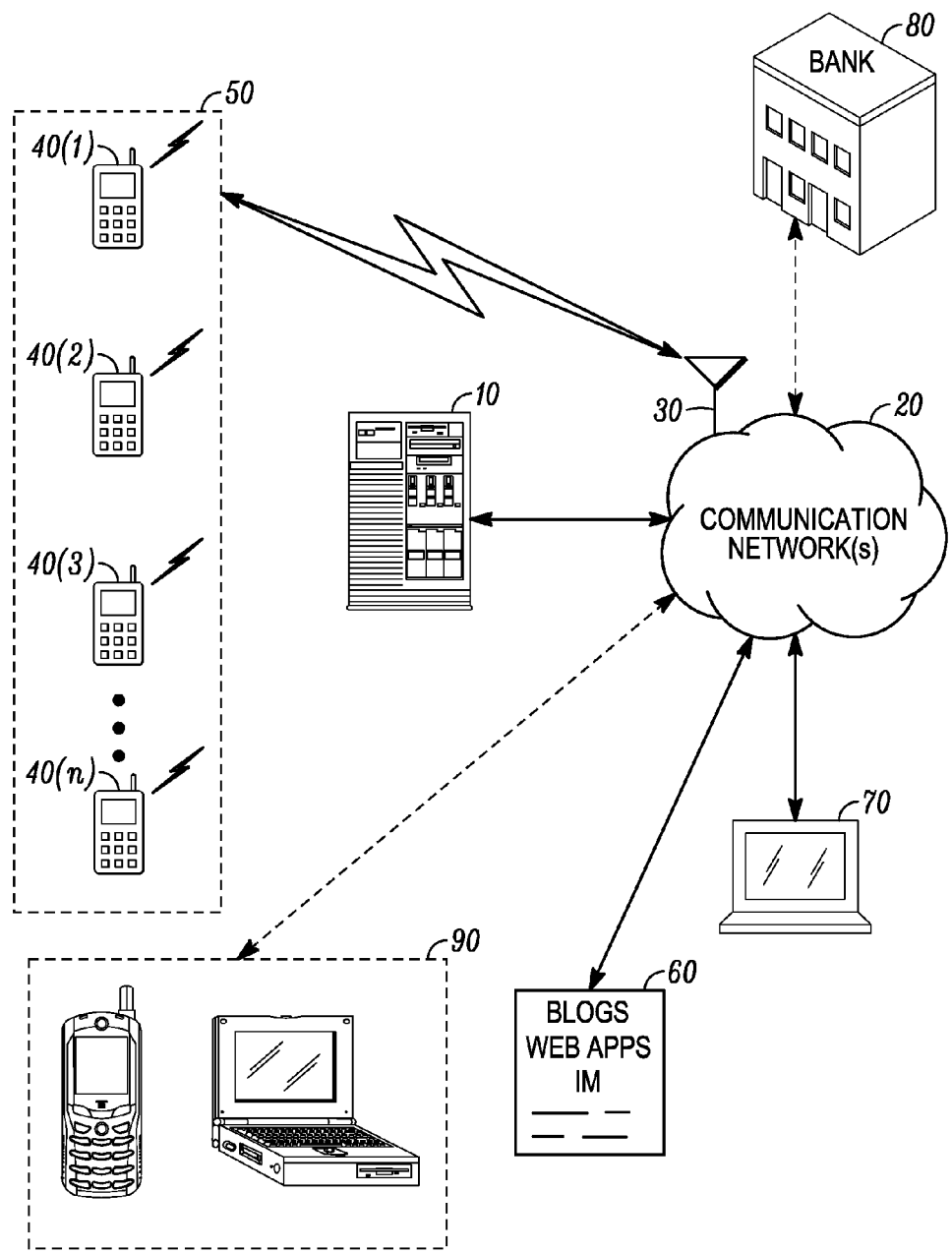
FIG. 1 is a system for saving money with a group of mobile devices.

FIG. 1 is a system for saving money with mobile devices. A computer 10 and mobile devices 40 are in communication via at least one communication network 20. Each mobile device 40(1) through 40(n) belongs to a user of a plurality of users. While four mobile devices 40 are shown, there may be a greater or lesser number of mobile devices. The users, or members, of group 50 each have a savings goal, that is, an amount of money they each wish to save over a specified period of time. One exemplary savings goal for a family (having mobile devices 40(1), 40(2), 40(3)) is to save $1920 over sixteen week for a family vacation. In this example, the family 50 should save $120/week.

So, in one example users of mobile devices in the group (40(1), 40(2), 40(3)) make purchasing decisions throughout a typical day, for example whether to buy a snack, to go to the movies, take a taxi, and the like. These are generally low cost items that offer immediate gratification. The users have the opportunity to commit the money that they would spend on these items to the savings goal rather than spending it. In one example, Jim, the user of mobile device 40(1), when presented with the decision of whether to purchase a snack, decides not to and sends a text message from the mobile device 40(1) describing an amount representing the money not spent, or portion of the money not spent, and the product or service not purchased. One exemplary text message is "$5 snack." This text message is received by computer 10 over the communication network 20. The computer 10 records the amount and description of the product or service, as well as an identifier identifying the sender.

The computer 10 then forwards, over the communication network 20, a message such as a text message to the other mobile devices 40(2) and 40(3) comprising the amount, the good or service not purchased, and the name of the person who decided not to purchase, for example, "Jim, $5 snack!" Knowing that a savings partner has committed money to the savings goal encourages others in the group to do the same. For example, after receiving the text message, Sally, the user of mobile device 40(2) is presented with the dilemma of whether to purchase a shirt that costs $24 or one that costs $32. Sally, desirous to go on vacation, and being encouraged by the actions of Jim, decides not to purchase the more expensive shirt but rather to purchase the less expensive one. Accordingly, Sally, the user of mobile device 40(2) sends a text message such as "$8 cheaper shirt." The message is received by computer 10 which then transmits a message to the other mobile devices 40(1) and 40(3) such as "Sally, $8 cheaper shirt!". In this way all member of the group are aware of each others' actions and are accordingly encouraged to save.

In another example, Jim chooses not to purchase a pair of shoes that cost $100, but only wants to contribute $30 to the savings goal. In this case, an exemplary text message is "$30 shoes." Thus, with respect to not spending money "an amount" or "the amount" is understood herein to include the total amount of the money saved (that is, not spent), or a portion thereof. In yet another example, in order to save money, Sally chooses to stay home instead of going out with her friends on the weekend. Sally knows from experience that if she goes out with her friends she is likely to spend around $60. In this case, an exemplary message is "$60, stayed home and didn't go out with friends." Thus, with respect to not spending money, the "description of the good or service not purchased" is understood herein to include not taking part in an event or activity, giving up an event or activity, or any other action that results in money not being spent.

In addition to storing the descriptions and amounts not spent, computer 10 also keeps a running total of the amount of money not spent, that is the amount of money saved towards the savings goal. Computer 10 generates periodic reports from the stored information. The reports, such as graphs and figures, show progress made towards the savings goal. The reports may be transmitted to the mobile devices 40 of the users, published as a web page to be viewed by other computers 70, transmitted to a "cheering section" 90, that is a group of people who are not saving but want to encourage group 50 to save, to blogs, web applications, social networks, instant messaging applications, email, and the like.

Computer 10 may transmit periodic message reminders to the users (that is the mobile devices 40) reminding them to transfer the money they have saved that period to a savings account 80. Each user may receive a different message as each user may have saved a different amount. The message reminders may also be transmitted to email addresses and the like.

Each user may have a different savings goal, and each user may have a different or individual savings account 80. In one embodiment, the users pool their money and resources to reach a common savings goal. In another embodiment, each user has an individual and different savings goal and separate savings account. For example, one user's savings goal may be to reduce credit card debt, and another user's savings goal may be to save for a vacation.

Some or all of the users may optionally provide bank account information, stored by computer 10, so that computer 10 can automatically transfer money from one bank account such as the user's checking account, to a savings account 80. For example, an Automated Clearing House (ACH) transfer could be executed on a weekly basis for the amount saved by each of the users.

Furthermore, members of the cheering section 90 can transmit messages to members of the group 50 in order to encourage them. Exemplary messages include "Sally, you better stop buying shoes" and "If you can all save $160 next week I will give you a gift of $50." In this way, other members of the cheering section can contribute to the saving goal as well as encourage the group 50.

Figure 2:
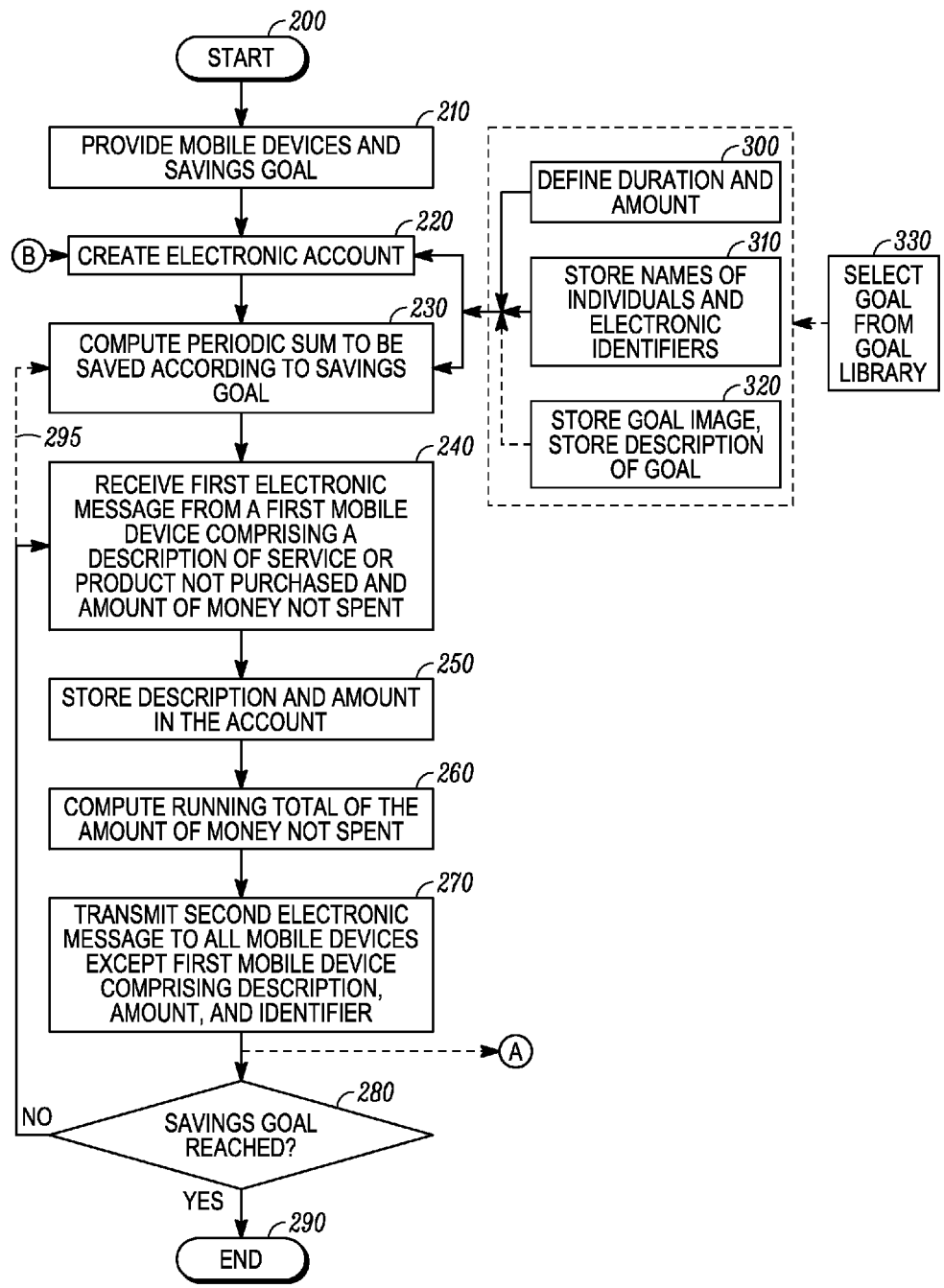
FIG. 2 is a method for saving money with a group of mobile devices.

Now, with the system of FIG. 1 in mind, FIG. 2 shows a method for saving money with mobile devices. At step 210 a plurality of mobile devices is provided. Each of the plurality of mobile devices belongs to or is operated by a user of a plurality of users. The plurality of users of the group may also be referred to herein as "savings partners." Each of the plurality of users has a savings goal. The savings goal may be common for the plurality of users, or different for some of the users in the group. The savings goal, for example, includes an amount of money to save and a length of time.

At step 220 an electronic account is created. The account is created and stored at a computer. The account stores, for example, identifying information about each of the plurality of users, the savings goal, and how the savings goal is divided among the plurality of users. The identifying information about each of the users includes the name of the user and a unique electronic identifier (step 310). The electronic identifier is for contacting the user electronically, that is sending an electronic message to the user. Each user may have more than one electronic identifier. Examples of electronic identifiers include email address, mobile phone numbers, user IDs for instant messaging services, user IDs for social networking application, user IDs for blogs and micro-blogs, and the like. The account may also store bank information.

The account may be created by one or more than one of the savings partners. In creating the account, the savings goal is defined. So, the step of creating the electronic account 220 further includes defining a duration and an amount of money to save (step 300). For example, if there are four savings partners and their savings goal is to save $1040 over eight weeks then their common savings goal amount is $1040 and the duration is 8 weeks. Step 220 may also include selecting or uploading a goal image and a description of the goal which is stored in the account (step 320). For example, using the above example, the common amount to save is $1040, and the duration is eight weeks. The description is, for example, "Trip to Costa Rica!". One or more of the users may select or upload an image of a beach, for example, to be displayed as their exemplary goal image.

At step 230 a periodic sum of money to be saved by the plurality of users is computed according to the savings goal. Using the savings goal example of $1040 over eight weeks for four users (also referred to herein as savings partners), one exemplary computation of the periodic total sum of $130/wk ($1040/8 weeks), the period being one week, and with each savings partner having an individual periodic savings goal of $32.50 ($1040/8 weeks/4 users). This is only one exemplary computation however and it is noted that elements of the savings goal can be modified or adjusted so that the periodic total sum and individual periodic savings goal varies from varies from period to period, the length of the period varies, and the individual periodic savings goal is different or varies among the savings partners. This is, at least in part, designated by arrow 295. Thus, step 230 of computing the periodic sum may further include computing the periodic sum such that it is different for at least some of the plurality of users, or is different for all of the plurality of users from period to period, or such that the length of time of the period is variable.

Figure 3:
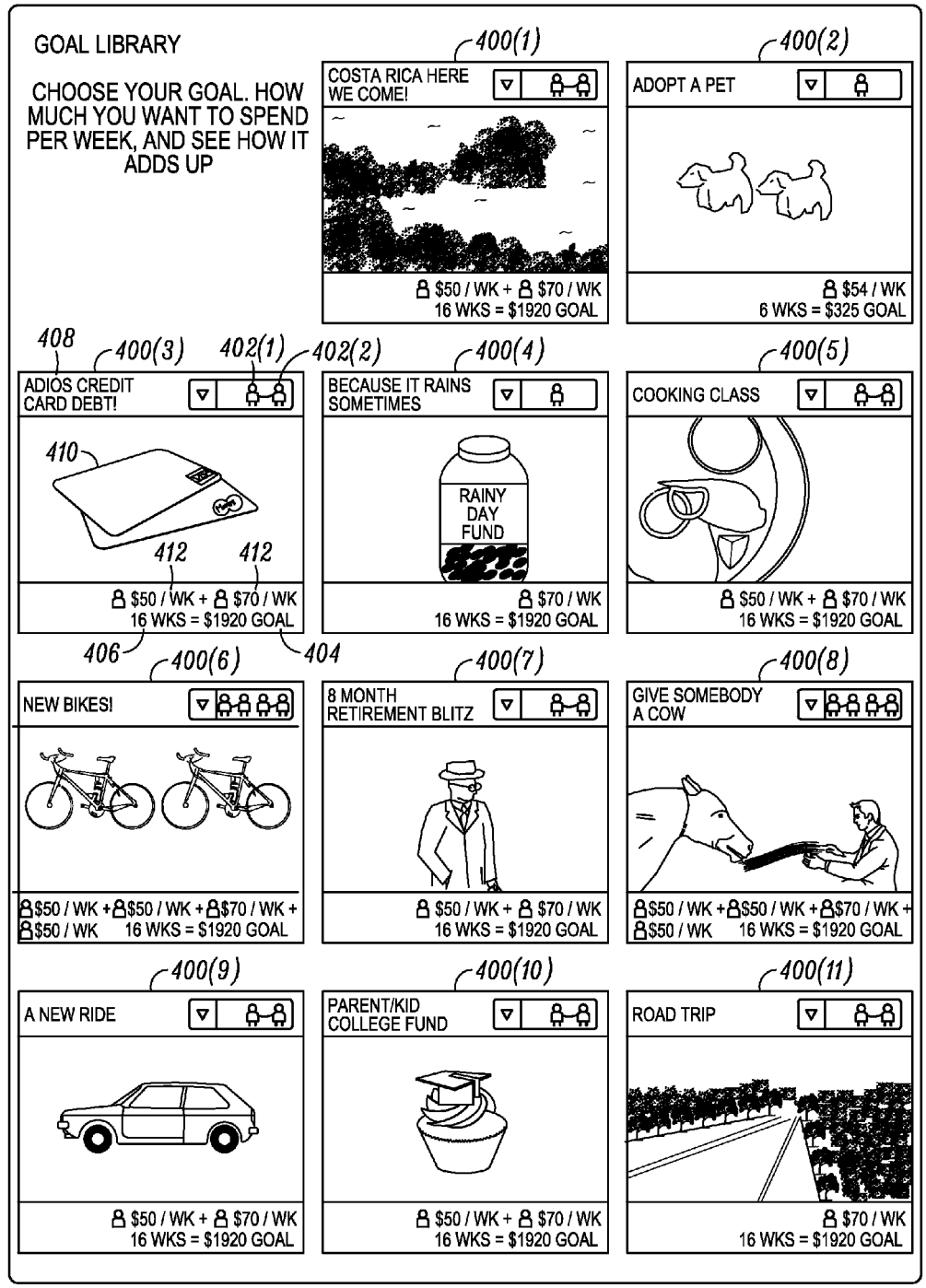
FIG. 3 is an exemplary goal library.

The method of FIG. 2 may also include selecting a goal from a library of goals. In this way a "template" may be presented to automate at least some of the elements of steps 220 and 230. FIG. 3 shows one such exemplary goal library. Each of the goals 400 includes at least some of the elements resulting from steps 300, 310, and 320. Examining goal 400 (3), there are two users (step 310) as show by icons 402, the amount (step 300) is $1920 as denoted by "goal" 404, the duration (step 300) is 16 weeks as denoted by "duration", the description 408 (step 320) is "Adios Credit Card Debt!", and the image 410 (step 320) is an image of credit cards. In this example, the periodic sum to be saved (step 230) as denoted by lead line 412 is "$50/wk" for user 402(1) and "$70/wk" for user 402(2). Those skilled in the art will appreciate that these are only a few of the steps and element in creating an electronic account and computing a periodic sum and that many variations and changes are possible while remaining within the scope the present invention.

Turning back to FIG. 2, at step 240 a first electronic message from a first mobile device of the plurality of mobile devices is received. The first electronic message comprises, at least, a description of a service or product not purchased by user of the first mobile device and the amount of money not spent. Revisiting the example given above, Jim sends a text message ("$5 snack") from his mobile phone (40(1) of FIG. 1) which is received (step 290) by the computer (10 of FIG. 1), the computer being operative to receive electronic messages such as text messages. This first electronic message is transmitted when Jim makes his decision to not purchase the snack. It is noted that the term "first mobile device" refers to the mobile device that is currently transmitting the electronic message and that any one of the mobile devices may be considered the first mobile device. "First mobile device" should not be confused with any particular order in which the mobile devices are physically arranged in the figures. From iteration to iteration of the method of FIG. 2, any one of the mobile devices can be the first mobile device.

At step 250 the description and amount are stored in the account, and they are associated with the user by way of the electronic identifier. In the present example, the electronic identifier is the mobile phone number of Jim's mobile phone (40(1) of FIG. 1).

At step 260 a running total of the amount of money not spent (that is, the money saved) is computed. This is computed separately for each of the savings partners since they may each have different savings goals and savings from week to week. If the savings goal is common, it is computed in aggregate to determine if the common savings goal has been reached.

At step 270 a second electronic message is transmitted to all of the plurality of mobile devices except the first mobile device. The second electronic message comprises the description, amount, and an identifier identifying the user of the first mobile device. Recall, this information is available as described with reference to step 310. The second electronic message may be transmitted to a mobile phone number, an email address, a blog, a micro-blog, an instant messaging application, a web application, or any electronic device operable to receive messages. Web applications may include any program that can be executed in a web browser or served from a server to a client computer, including applications such as Facebook and other social networking sites. Many social networking sites provide an application programming interface for developing third party social applications. Accordingly, "web application" as used herein also includes such applications. Also, a third electronic message may be transmitted to the first mobile device. The third electronic message may comprise, for example, confirmation of receipt of the first electronic message, a copy of the first electronic message, or other information.

Next, at step 280 it is determined if the savings goal has been reached. The savings goal is reached when the running total of step 260 is at least equal to the amount of the savings goal. Steps 240, 250, 260, and 270 are repeated if the savings goal or goals have not been reached.

Figure 4:
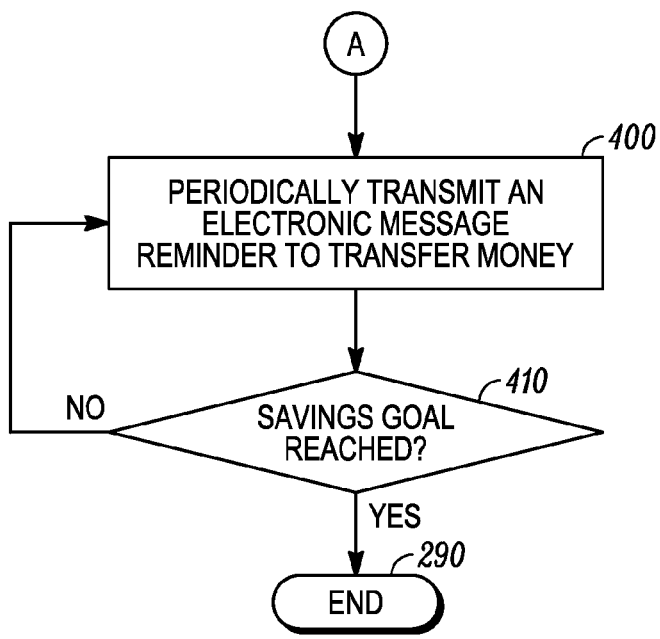
FIG. 4 is a method for periodically transmitting electronic message reminders.

Referring to FIG. 4, at step 400 an electronic message reminder is periodically transmitted (for example, from the computer 10 of FIG. 1) reminding the plurality of users to transfer money to a bank account. These periodic reminders are sent until the savings goal is reached (step 410). The periodic reminders can be sent to each user only until their individual savings goal is reached. The period may be, for example, monthly. The amount of money the electronic message reminds each user to transfer may vary among users since their individual savings goals may be different, and their actual savings may be more or less than their goals. Thus, the electronic message reminders may be tailored based on each users' description and amount (step 250), and individual running totals and aggregate running totals (step 260). Some or all of this information is transmitted to each user according to their electronic identifier. Depending on the electronic identifiers, the electronic message reminders may be transmitted to, for example, mobile devices, and to computers, such messages to computers including email, blogs, micro-blogs, web pages, RSS feeds, instant messaging applications, web applications, and the like.

Figure 5:
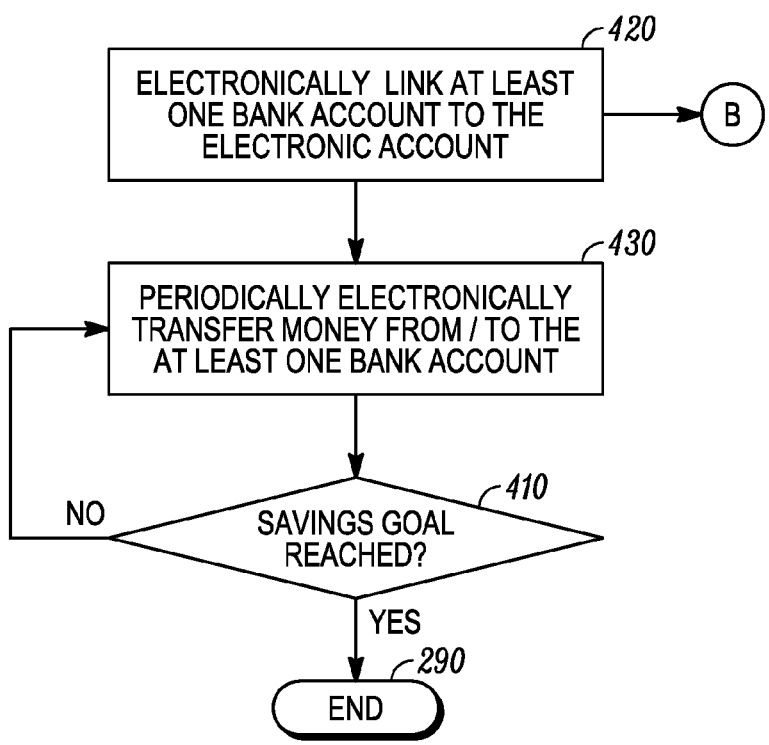
FIG. 5 is a method for periodically automatically transferring money to a bank account.

FIG. 5 shows a method for periodically electronically transferring money according to the users' savings goal and savings progress. This method may be used alone or in combination with the method of FIG. 4. At step 420, at least one bank account is linked to the electronic account created in step 220. For example, if the savings goal is common for a family, the family's checking account and savings account may be linked. In another example, the savings goal is for a group of friends and each friend has a different savings goal, and a separate and individual savings account.

One way of linking accounts is to store bank account numbers and bank routing numbers associated with each user. In this way, the computer can execute electronic money transfers, such as automated clearing house (ACH) transfers from each user's checking account to the corresponding savings account.

No matter the type of transfer executed and the details of the accounts that are stored, at step 430 money is periodically electronically transferred from at least one bank account to at least one other bank account. As disclosed with reference to FIG. 4, the period and amounts may vary according to each user. The periodic electronic transfers continue until the savings goal is reached (step 440).

Figure 6:
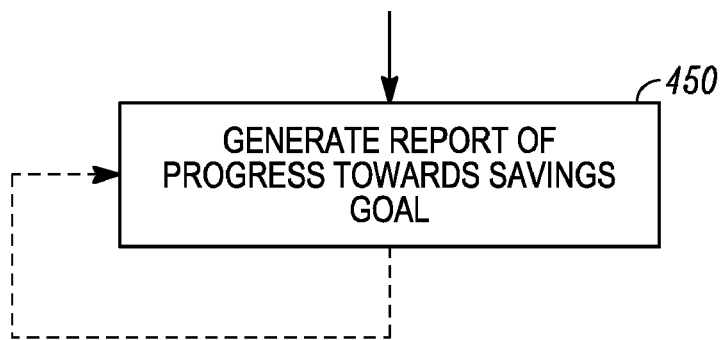
FIG. 6 is a method for generating reports of progress made towards a savings goal.

As shown in FIG. 6, and as already mentioned above, the computer also generates reports. The reports, including graphs and figures, show progress made towards the savings goal and may also show progress made towards individual savings goals. The reports may be transmitted or published to the mobile devices, to other computers to be displayed as a web page, to a "cheering section", that is a group of individuals who are not savings partners but want to encourage the savings partners, to blogs, web applications, social networks, instant messaging applications, email, and the like. The reports may be periodic, such as weekly, as long as the savings goal has not been reached (step 280), and they may also be a final report such as once the savings goal has been reached (step 280). The reports may show progress of each user in relation to their individual savings goal, and they may show progress of the savings partners as a whole. Those skilled in the art will recognize that many different types of reports may be generated, all within the scope of the present invention.

Figure 7:
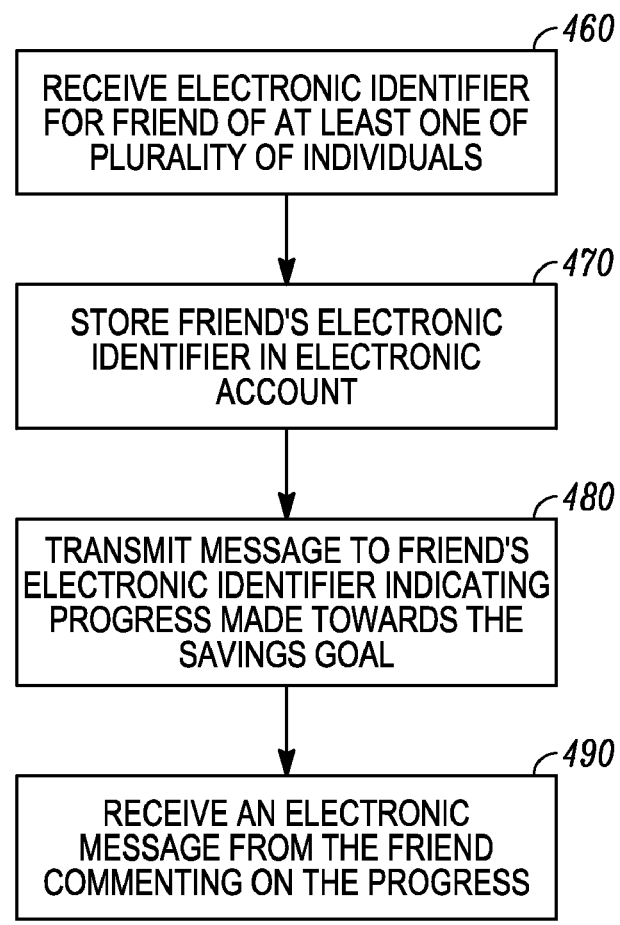
FIG. 7 is a method for friends to encourage a plurality of users to save.

FIG. 7 shows a method for friends to encourage the plurality of users to save. At least one electronic identifier for at least one friend of the plurality of users is received at step 460. At step 470 the friend's electronic identifier is stored in the electronic account. In storing this electronic identifier, it may be associated with one or more users of the plurality of users. Users may have the same or different friends. At step 480 a message is transmitted to the friend's electronic identifier indicating progress made towards the savings goal. The message may include, for example, any of the elements described above with reference to messages and reports. At step 490, a message is received from a computer or mobile device of the friend (90 of FIG. 1), the message commenting, for example, on the progress made towards the savings goal. The message received at step 490 may further be transmitted to one or more than one of the mobile devices (40 of FIG. 1). The message may also be displayed with other reports and other messages to further encourage the plurality of users to save.

Referring back to the figures, many other variations are possible. For example, users (40 of FIG. 1) may have more than one savings goal, and they may belong to more than one group (50 of FIG. 1). Also, users (40 of FIG. 1) may save without a specific goal in mind. In such an embodiment, the duration and amount of the savings goal (step 300 of FIG. 2) may be defined, either alone or in combination, as a number so large such that it is never possible to reach in one's lifetime (for example, $10^{10}$). In this case, the savings goal is never reached (step 280 of FIG. 2) and the method of FIG. 2 only ends when ended manually. Also, it is possible that there is only one user. Is this case, no second electronic message is transmitted (step 270 of FIG. 2 is skipped). Instead, the third electronic message disclosed above is transmitted to the first mobile device. The third electronic message may be an automated response selected from a list of responses. For example, after the description and the amount is received (step 240 of FIG. 1), the third electronic message may be "Way to go!" or "Congratulations!" or the like. Or the third electronic message may comprise the running total (step 260 of FIG. 2), for example.

Finally, it is appreciated that the mobile devices 40 may comprise many different types of mobile devices such as cell phones, smart phones, PDAs, portable computers, and any other type of mobile device operable to transmit and receive electronic messages. The computer network(s) 20 may include the internet and wireless networks such as a mobile phone network 30. Computer 10 may be one or more computers and may comprise any type of computer capable of storing computer executable code and executing the computer executable code on a microprocessor, and communicating with the communication network(s) 20. For example computer 10 may be a web server. The electronic identifiers include email addresses, mobile phone numbers, user IDs for instant messaging services, user IDs for social networking application, user IDs and URLs for blogs and micro-blogs, URIs, and the like. It is appreciated that other elements and configurations of FIG. 1 are possible while remaining within the scope of the present invention.

The foregoing detailed description has discussed only a few of the many forms that this invention can take. It is intended that the foregoing detailed description be understood as an illustration of selected forms that the invention can take and not as a definition of the invention. It is only the following claims, including all equivalents, that are intended to define the scope of this invention.

What is claimed is:

1. A method for saving money with mobile devices comprising the steps of:
    providing a plurality of mobile devices, each of the plurality of mobile devices belonging to a user of a plurality of users, the plurality of users having a savings goal;
    creating an electronic account;
    computing a periodic sum of money to be saved by the plurality of users according to the savings goal;
    receiving a first electronic message from a first mobile device of the plurality of mobile devices, the first electronic message comprising a description by the user of the first mobile device and an amount of money not spent;
    storing the description and the amount in the account;
    computing a running total of the amount of money not spent;
    transmitting a second electronic message to all of the plurality of mobile devices except the first mobile device, the second electronic message comprising the description, the amount not spent by the user, and an identifier identifying the user of the first mobile device; and
    repeating the steps of receiving, storing, computing a running total, and transmitting until the savings goal is reached.

2. The method of claim 1 further comprising periodically transferring an amount of money to a bank account equal to at least some of the running total.

3. The method of claim 1 further comprising electronically linking at least one bank account to the electronic account, and periodically electronically transferring an amount of money from at least one bank account to at least one other bank account.

4. The method of claim 1 further comprising transmitting an electronic message reminder to transfer money to a bank account.

5. The method of claim 4 wherein the step of transmitting an electronic message reminder further comprises at least one of the following: transmitting an electronic message to at least some of the mobile devices, and transmitting an electronic message to an internet connected computer.

6. The method of claim 1 further comprising creating a report showing progress made towards the savings goal.

7. The method of claim 1 wherein at least one of the first electronic message and the second electronic message are each at least one of the following: an email, a text message, a blog posting, an instant message, and message to a social networking site.

8. The method of claim 1 wherein the step of transmitting a second electronic message comprises transmitting the second electronic message to at least one of the following: an email address, a blog, a micro-blog, a social networking site, an instant messaging application, and a web application.

9. The method of claim 1 further comprising:
receiving at least one electronic identifier for at least one friend of the plurality of users; and
storing the at least one electronic identifier in the electronic account.

10. The method of claim 9 further comprising transmitting a message to the at least one electronic identifier of the at least one friend indicating progress made towards the savings goal.

11. The method of claim 9 further comprising receiving a message from the at least one friend commenting on the savings goal.

12. The method of claim 1 wherein the step of computing a savings goal further comprises adjusting the savings goal such that it is at least one of the following: different for at least some of the plurality of users, and different from period to period.

13. The method of claim 1 wherein the first electronic message is received from the first mobile device around the same time as the user of the first mobile device decides not to purchase the service or product.

14. The method of claim 1 wherein the step of creating the electronic account further comprises choosing at least some of the following: a duration, an amount of money to save, a goal image, and a description of the goal.

15. The method of claim 1 wherein the step of creating the electronic account further comprises storing in the account for each of the plurality of users a name and an electronic identifier.

16. The method of claim 1 wherein the step of creating further comprises selecting a savings goal from a library of goals.

17. The method of claim 1 further comprising transmitting a third electronic message to the first mobile device.

18. A method for saving money with mobile devices comprising the steps of:
providing a plurality of mobile devices, each of the plurality of mobile devices belonging to a user of a plurality of users, the plurality of users having a savings goal;
creating an electronic account at a computer;
computing a periodic sum of money to be saved by the plurality of users according to the savings goal;
receiving a first electronic message from a first mobile device of the plurality of mobile devices, the first electronic message comprising a description of a service or product not purchased by the user of the first mobile device and an amount of money not spent, wherein the first electronic message is received from the first mobile device around the same time as the user of the first mobile device decides not to purchase the service or product;
storing the description and the amount in the account;
computing a running total of the amount of money not spent;
transmitting a second electronic message to all of the plurality of mobile devices except the first mobile device, the second electronic message comprising the description, the amount not spent by the user, and an identifier identifying the user of the first mobile device; and
repeating the steps of receiving, storing, computing a running total, and transmitting until the savings goal is reached.

19. A system for saving money with mobile devices comprising:
at least one communication network, the at least one communication network comprising a wireless network, and the internet;
a plurality of mobile devices operable to send and receive electronic messages, the plurality of mobile devices in wireless communication with the at least one communication network, each of the plurality of mobile devices belonging to a user of a plurality of users, the plurality of users having a savings goal; and
a computer in communication with the at least one communication network, the computer comprising a storage device and a microprocessor, the storage device comprising computer executable code which when executed by the microprocessor causes the computer to:
(a) receive a first electronic message from a first mobile device of the plurality of mobile devices, the first electronic message comprising a description by the user of the first mobile device and an amount of money not spent;
wherein the first electronic message is received from the first mobile device around the same time as the user of the first mobile device decides not to purchase the service or product;
(b) store the description and the amount in a database;
(c) compute a running total of the amount of money not spent;
(d) transmit a second electronic message to all of the plurality of mobile devices except the first mobile device, the second electronic message comprising the description, the amount not spent by the user, and an identifier identifying the user of the first mobile device; and
(e) repeat (a)-(d) until the savings goal is reached.

20. The system of claim 19 further comprising computer executable code which when executed by the microprocessor causes the computer to do at least one of the following:
transmit an electronic message reminder to transfer money to a bank account;
create a report showing progress made towards the savings goal; and
transmit a message to a friend indicating progress made towards the savings goal and receive a message from a friend commenting in the savings goal.

21. The system of claim 19 further comprising an electronic bank account in communication with the at least one communication network.

22. The system of claim 19 wherein the computer is one of the devices of the plurality of mobile device.

* * * * *